United States Patent
Park et al.

(10) Patent No.: US 11,349,593 B2
(45) Date of Patent: May 31, 2022

(54) METHOD AND DEVICE FOR TRANSMITTING AND RECEIVING CONTROL INFORMATION IN WIRELESS CELLULAR COMMUNICATION SYSTEM

(71) Applicant: Samsung Electronics Co., Ltd., Gyeonggi-do (KR)

(72) Inventors: Sungjin Park, Gyeonggi-do (KR); Jinyoung Oh, Gyeonggi-do (KR); Taehyoung Kim, Gyeonggi-do (KR); Jonghyun Bang, Gyeonggi-do (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 38 days.

(21) Appl. No.: 16/980,689

(22) PCT Filed: Apr. 30, 2019

(86) PCT No.: PCT/KR2019/005175
§ 371 (c)(1),
(2) Date: Sep. 14, 2020

(87) PCT Pub. No.: WO2019/216588
PCT Pub. Date: Nov. 14, 2019

(65) Prior Publication Data
US 2021/0013991 A1 Jan. 14, 2021

(30) Foreign Application Priority Data
May 11, 2018 (KR) .......................... 10-2018-0054223

(51) Int. Cl.
*H04L 1/00* (2006.01)
*H04W 76/11* (2018.01)
(Continued)

(52) U.S. Cl.
CPC .......... *H04L 1/0003* (2013.01); *H04L 1/0061* (2013.01); *H04W 8/24* (2013.01);
(Continued)

(58) Field of Classification Search
CPC ... H04L 1/0003; H04L 1/0061; H04L 5/0053; H04L 1/0023; H04L 5/0091;
(Continued)

(56) References Cited

U.S. PATENT DOCUMENTS 9,197,385 B2  11/2015  Khoshnevis et al.
10,432,288 B2  10/2019  Kwak et al.
(Continued)

FOREIGN PATENT DOCUMENTS

KR  1020180047891  5/2018
WO  WO2014/155899  10/2014
(Continued)

OTHER PUBLICATIONS

Panasonic, "MCS Indication for 256QAM", R1-140502, 3GPP TSG-RAN WG1 Meeting 76, Feb. 10-14, 2014, 6 pages.
(Continued)

*Primary Examiner* — Kiet Tang
(74) *Attorney, Agent, or Firm* — The Farrell Law Firm, P.C.

(57) ABSTRACT

The present disclosure relates to a communication technique for combining IoT technology with a 5G communication system for supporting a higher data transmission rate than 4G communication systems, and a system therefor. The present disclosure may be applied to intelligent services (e.g., smart home, smart building, smart city, smart car or connected car, healthcare, digital education, retail, security- and safety-related services, etc.) on the basis of 5G communication technology and IoT-related technology. The
(Continued)

present disclosure relates to a method and device for transmitting and receiving control information.

18 Claims, 13 Drawing Sheets

(51) Int. Cl.
*H04W 8/24* (2009.01)
*H04W 72/04* (2009.01)
(52) U.S. Cl.
CPC ..... *H04W 72/042* (2013.01); *H04W 72/0466* (2013.01); *H04W 76/11* (2018.02)
(58) Field of Classification Search
CPC ....... H04L 1/0016; H04L 1/00; H04L 5/0007; H04W 8/24; H04W 72/042; H04W 72/0466; H04W 76/11
See application file for complete search history.

(56) References Cited

U.S. PATENT DOCUMENTS

| | | | |
|---|---|---|---|
| 2013/0016676 A1 | 1/2013 | Lohr et al. | |
| 2017/0070374 A1 | 3/2017 | Nakamura et al. | |
| 2017/0223686 A1* | 8/2017 | You | H04L 5/0048 |
| 2019/0028243 A1 | 1/2019 | Kim et al. | |
| 2020/0374911 A1* | 11/2020 | Lee | H04W 72/1289 |
| 2020/0382256 A1* | 12/2020 | Faxer | H04W 72/042 |
| 2020/0412431 A1* | 12/2020 | Park | H04B 7/0469 |

FOREIGN PATENT DOCUMENTS

| | | |
|---|---|---|
| WO | WO20147/043878 | 3/2017 |
| WO | WO 2017/171956 | 10/2017 |

OTHER PUBLICATIONS

Ericsson, "Offline Discussion on Support of Separate CQI and MCS Table(s) for URLLC", R1-1807748, 3GPP TSG RAN WG1 Meeting #93, May 21-25, 2018, 11 pages.
European Search Report dated Mar. 30, 2021 issued in counterpart application No. 19798994.0-1216, 10 pages.
PCT/ISA/210 Search Report issued on PCT/KR2019/005175, dated Aug. 5, 2019, pp. 7.
PCT/ISA/237 Written Opinion issued on PCT/KR2019/005175, dated Aug. 5, 2019 pp. 5.
3GPP TS 38.523-1 V0.3., May 1, 2018, 3rd Generation Partnership Project; Technical Specification Group Radio Access Network; 5GS; UE conformance specification; Part 1: Protocol conformance specification (Release 15), pp. 429.
3GPP TS 38.214 V15.1.0, Apr. 9, 2018, 3rd Generation Partnership Project; Technical Specification Group Radio Access Network; NR; Physical layer procedures for data (Release 15), pp. 79.

* cited by examiner

METHOD AND DEVICE FOR TRANSMITTING AND RECEIVING CONTROL INFORMATION IN WIRELESS CELLULAR COMMUNICATION SYSTEM

PRIORITY

This application is a National Phase Entry of PCT International Application No. PCT/KR2019/005175 which was filed on Apr. 30, 2019, and claims priority to Korean Patent Application No. 10-2018-0054223, which was filed on May 11, 2018, the content of each of which is incorporated herein by reference.

TECHNICAL FIELD

The disclosure relates to a wireless communication system and, more particularly, to a method and apparatus for smoothly providing a service in a communication system. More specifically, the disclosure relates to a method and apparatus for transmitting or receiving control information by a terminal in a communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

As described above, a plurality of services can be provided to a user in a communication system, and in order to provide the plurality of services to the user, a method capable of providing respective services according to characteristics in the same time section and an apparatus using the same are required. Various services provided in the 5G communication system are being studied, and one criterion for such services is a service that satisfies a low-latency requirement. Another one is that the services satisfy a high-reliability requirement. Consideration of both of these requirements is described in the disclosure as ultra-reliability and low latency communication (URLLC). In order to dynamically support a service that satisfies various URLLC requirements, a base station needs a method of dynamically supporting various methods of performing transmission to a terminal.

DISCLOSURE OF INVENTION

Technical Problem

An embodiment of the specification has been proposed in order to solve the above-mentioned problems, and aims to provide a method and an apparatus for simultaneously providing different types (or the same type) of services. In addition, an embodiment of the specification is to provide various methods and apparatuses for determining a modulation and coding scheme (MCS) by a terminal. In addition, an embodiment of the specification is to provide a method and apparatus for supporting multiple modulation and coding schemes (MCS) by a base station. Specifically, an embodiment is to provide a method for indicating or configuring, by a base station, a specific MCS table for a terminal in a situation where the terminal receives support according to two or more MCS tables.

Solution to Problem

In order to solve the above problems, a method by a terminal according to an embodiment includes: receiving, from a base station, downlink control information (DCI) for scheduling a physical downlink shared channel (PDSCH) or a physical uplink shared channel (PUSCH); identifying a radio network temporary identifier (RNTI) scrambled in a cyclic redundancy check (CRC) of the DCI; and if the CRC of the DCI is scrambled by an RNTI associated with a modulation and coding scheme (MCS) table, determining a modulation order and a target code rate to be used for the PDSCH or the PUSCH, based on a first MCS table associated with the RNTI.

In order to solve the above problems, a method by a base station according to an embodiment includes: generating downlink control information (DCI) for scheduling a physical downlink shared channel (PDSCH) or a physical uplink shared channel (PUSCH); scrambling a cyclic redundancy check (CRC) of the DCI using a radio network temporary identifier (RNTI), which is identified based on a modulation order and a target code rate to be used for the PDSCH or the PUSCH; and transmitting the DCI to a terminal, wherein, if the CRC of the DCI is scrambled by an RNTI associated with a modulation and coding scheme (MCS) table, the modulation order and the target code rate are determined based on a first MCS table associated with the RNTI.

In order to solve the above problems, a terminal according to an embodiment includes: a transceiver configured to transmit or receive a signal; and a controller configured to receive, from a base station, downlink control information (DCI) for scheduling a physical downlink shared channel (PDSCH) or a physical uplink shared channel (PUSCH), identify a radio network temporary identifier (RNTI) scrambled in a cyclic redundancy check (CRC) of the DCI, and if the CRC of the DCI is scrambled by an RNTI associated with a modulation and coding scheme (MCS) table, determine a modulation order and a target code rate to be used for the PDSCH or the PUSCH, based on a first MCS table associated with the RNTI.

In order to solve the above problems, a base station according to an embodiment includes: a transceiver configured to transmit or receive a signal; and a controller configured to generate downlink control information (DCI) for scheduling a physical downlink shared channel (PDSCH) or a physical uplink shared channel (PUSCH), scramble a cyclic redundancy check (CRC) of the DCI using a radio network temporary identifier (RNTI), which is identified based on a modulation order and a target code rate to be used for the PDSCH or the PUSCH, and transmit the DCI to a terminal, wherein, if the CRC of the DCI is scrambled by an RNTI associated with a modulation and coding scheme (MCS) table, the modulation order and the target code rate are determined based on a first MCS table associated with the RNTI.

Advantageous Effects of Invention

According to the current embodiment, a base station in a communication system supports various services having different latency and reliability requirements for different respective terminals. In addition, according to another embodiment, it is possible for a terminal to receive support of various modulation and coding schemes in a communication system.

MODE FOR THE INVENTION

Figure 1:
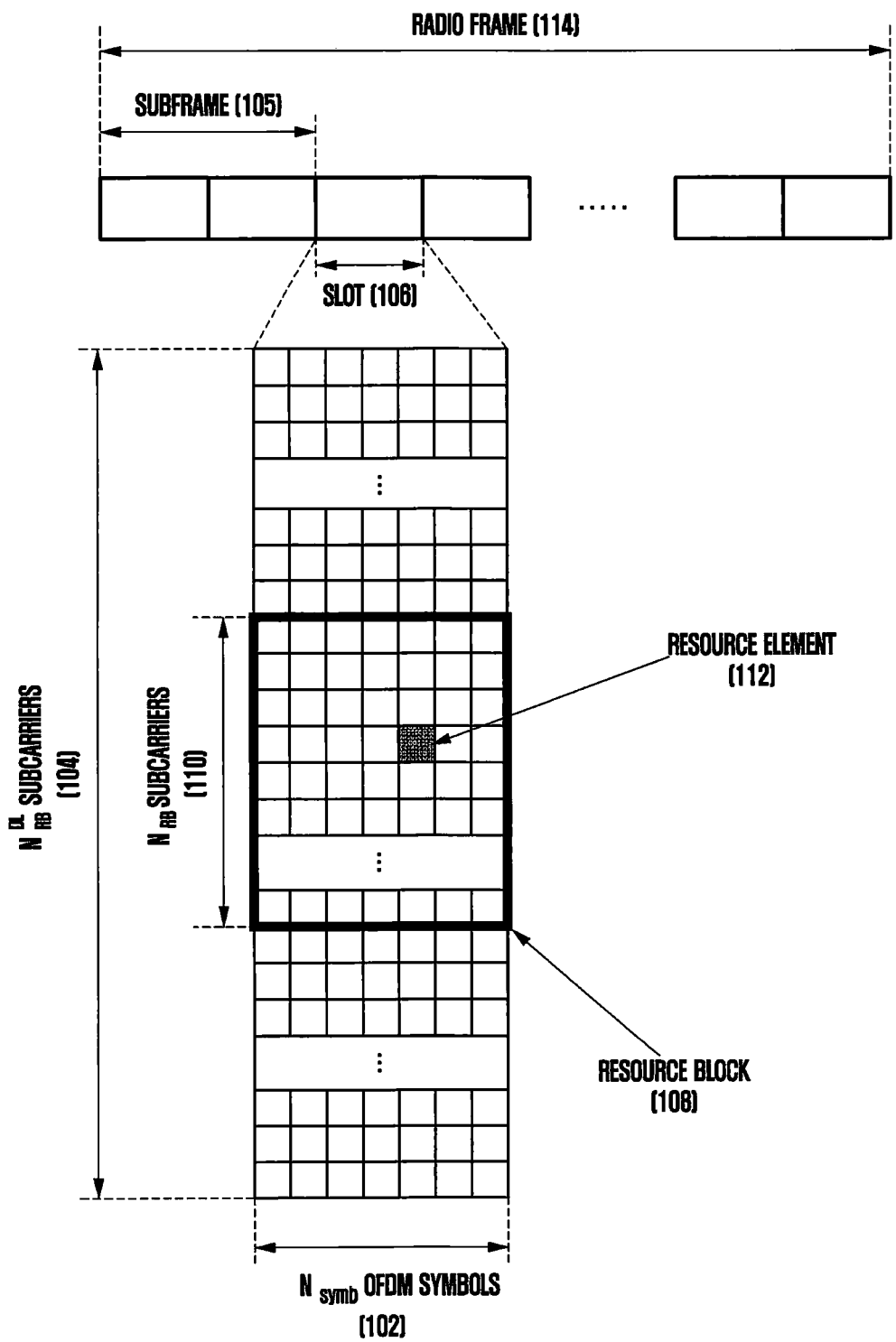
FIG. 1 illustrates a downlink time-frequency domain transmission structure of a long-term evolution (LTE) or LTE advanced (LTE-A) system.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Wireless communication systems, which provided voice-oriented services in early stages, have evolved into broadband wireless communication systems that provide high-speed and high-quality packet data services according to communication standards such as high-speed packet access (HSPA) of 3GPP, long-term evolution (LTE), evolved universal terrestrial radio access (E-UTRA), LTE-advanced (LTE-A), high-rate packet data (HRPD) of 3GPP2, ultra-mobile broadband (UMB), and IEEE 802.16e. In addition, a communication standard of 5G or new radio or next radio (NR) is being produced as a $5^{th}$-generation wireless communication system.

As described above, in a wireless communication system including a $5^{th}$-generation wireless communication system, at least one service among enhanced mobile broadband (eMBB), massive machine-type communications (mMTC), and ultra-reliable and low-latency communications (URLLC) may be provided to a terminal. The services may be provided to the same terminal during the same time period. In an embodiment, eMBB may be a service aiming at high-speed transmission of high-capacity data, mMTC may be a service aiming at minimization of terminal power consumption and access by multiple terminals, and URLLC may be a service aiming at high reliability and low latency, but the disclosure is not intended to be limited thereto. The three services may be a main scenario in an LTE system or a system such as 5G and/or NR after the LTE system. According to an embodiment of the disclosure, a method for coexistence between eMBB and URLLC or coexistence between mMTC and URLLC, and an apparatus using the same are described.

If a base station has scheduled, for any terminal, data corresponding to an eMBB service during a particular transmission time interval (TTI), if there occurs the situation where URLLC data must be transmitted during the TTI, a part of the eMBB data may not be transmitted in a frequency band in which the eMBB data is already scheduled and transmitted, but the generated URLLC data may be transmitted in the frequency band. The terminal for which the eMBB data has been scheduled and the terminal for which the URLLC data has been scheduled may be the same terminal or different terminals. In the example, since there occurs the situation where a part of the eMBB data that has already been scheduled for transmission is not actually transmitted, the possibility that the eMBB data will be damaged becomes higher. Accordingly, in the above case, it is necessary to determine a method for processing a received signal by the terminal for which the eMBB data has been scheduled or by the terminal for which the URLLC data has been scheduled, or a signal reception method thereof.

Therefore, according to an embodiment of the disclosure, a description is provided of a method for coexistence of heterogeneous services for enabling transmission of information according to each service when part or all of a frequency band is shared so as to schedule pieces of information (which may include data and control information) according to eMBB and URLLC, simultaneously schedule pieces of information according to mMTC and URLLC, simultaneously schedule pieces of information according to mMTC and eMBB, or simultaneously schedule pieces of information according to eMBB, URLLC, and mMTC.

Hereinafter, embodiments of the disclosure will be described in detail with reference to the accompanying drawings. In addition, in describing the disclosure, if it is determined that a detailed description of related functions or configurations may unnecessarily obscure the subject matter of the disclosure, the detailed description will be omitted. In addition, terms to be described later are terms defined in consideration of functions in the disclosure, and may vary according to a user's or operator's intention or practice. Therefore, the definition should be made based on the contents throughout this specification.

Hereinafter, a base station is the entity that performs resource allocation for a terminal, and may be at least one of a gNode B, an eNode B, a Node B, a base station (BS), a radio access unit, a base station controller, or a node on a network. A terminal may include a user equipment (UE), a mobile station (MS), a terminal, a cellular phone, a smart phone, a computer, or a multimedia system capable of performing communication functions. In the disclosure, a downlink (DL) indicates a radio transmission path of a signal transmitted by a base station to a terminal, and an uplink (UL) indicates a radio transmission path of a signal transmitted by the terminal to the base station. In addition, although an embodiment of the disclosure is described below as an example of an LTE or LTE-A system, the embodiment of the disclosure may be applied to other communication systems having a similar technical background or channel form. For example, 5G mobile communication technology, developed after LTE-A, may be included in other communication systems. In addition, the embodiments of the disclosure may be applied to other communication systems through some modifications within a range that does not significantly depart from the scope of the disclosure, according to the determination of those skilled in the art.

As a representative example of broadband wireless communication systems, an LTE system (hereinafter, examples of the LTE system may include LTE and LTE-A systems) adopts an orthogonal frequency division multiplexing (OFDM) scheme in a downlink, and adopts a single carrier frequency division multiple access (SC-FDMA) scheme in an uplink. The term "uplink" refers to a radio link through which a terminal transmits data or a control signal to a base station, and the term "downlink" refers to a radio link through which a base station transmits data or a control signal to a terminal. The above-described multiple access scheme normally allocates and operates time-frequency resources, which carry data or control information to be transmitted according to users, so as to prevent the time-frequency resources from overlapping each other, that is, establish orthogonality, thus making it possible to distinguish the data or control information of one user from another.

If a decoding failure occurs upon initial transmission, the LTE system adopts a hybrid automatic repeat request (HARQ) scheme for retransmitting the relevant data in a physical layer. If a receiver fails to accurately decode data, the HARQ scheme enables the receiver to transmit, to a transmitter, information (negative acknowledgement (NACK)) providing notification of the decoding failure and thus the transmitter can retransmit the corresponding data in the physical layer. The receiver combines the data retransmitted by the transmitter with the data for which decoding failed, thereby increasing the data reception performance. In addition, if the receiver accurately decodes the data, information (acknowledgement (ACK)) providing notification of decoding success is transmitted to the transmitter, and thus the transmitter may transmit new data.

FIG. 1 illustrates the basic structure of a time-frequency domain, that is, a radio resource domain, in which data or control information is transmitted in a downlink of an LTE system and a system similar thereto.

Referring to FIG. 1, the horizontal axis represents the time domain and the vertical axis represents the frequency domain. A minimum transmission unit in the time domain is an OFDM symbol, in which one slot 106 is configured by collecting $N_{symb}$ OFDM symbols 102 and one subframe 105 is configured by collecting two slots. The length of each slot is 0.5 ms and the length of each subframe is 1.0 ms. In addition, a radio frame 114 is a time domain unit which includes 10 subframes. The minimum transmission unit in the frequency domain is a subcarrier, in which the entire system transmission bandwidth includes a total of $N_{BW}$ subcarriers 104. In this configuration, the specific values may be variably applied.

The basic unit of resources in the time-frequency domain is a resource element (RE) 112, and may be represented by an OFDM symbol index and a subcarrier index. A resource block (RB) (or a physical resource block (PRB)) 108 may be defined by $N_{symb}$ consecutive OFDM symbols 102 in the time domain and $N_{RB}$ consecutive subcarriers 110 in the frequency domain. Accordingly, in one slot, one RB 108 may include $N_{symb} \times N_{RB}$ REs 122. Generally, the minimum allocation unit of data in the frequency domain is the RB unit. In the LTE system, generally, $N_{symb}$=7 and $N_{RB}$=12, and $N_{BW}$ may be proportional to the bandwidth of the system transmission band. The data rate is increased in proportion to the number of RBs scheduled for the terminal. The LTE system may define and operate six transmission bandwidths. In an FDD system, which operates the downlink and the uplink separated in the frequency domain, a downlink transmission bandwidth and an uplink transmission bandwidth may be different from each other. The channel bandwidth represents a radio frequency (RF) bandwidth, which corresponds to the system transmission bandwidth. <Table 1> below shows the correspondence relationship between the system transmission bandwidth and channel bandwidth defined in the LTE system. For example, in an LTE system having a channel bandwidth of 10 MHz, a transmission bandwidth may include 50 RBs.

TABLE 1

| Channel bandwidth BW_Channel [MHz] | 1.4 | 3 | 5 | 10 | 15 | 20 |
|---|---|---|---|---|---|---|
| Transmission bandwidth configuration N_RB | 6 | 15 | 25 | 50 | 75 | 100 |

Downlink control information may be transmitted within the first N OFDM symbols within the subframe. In an embodiment, generally, N={1, 2, 3}. Accordingly, the value of N may be variably applied to each subframe depending on the amount of control information that needs to be transmitted in the current subframe. The control information to be transmitted may include a control channel transmission section indicator, indicating the number of OFDM symbols in which the control information is transmitted, scheduling information for downlink data or uplink data, and information for HARQ ACK/NACK.

In the LTE system, scheduling information of downlink data or uplink data is delivered from a base station to a terminal through downlink control information (DCI). The DCI may be defined depending on various formats. According to each format, the DCI may indicate whether the DCI is scheduling information (UL grant) of the uplink data or scheduling information (DL grant) of the downlink data, whether the DCI is compact DCI having small-sized control information, whether to apply spatial multiplexing using multiple antennas, whether the DCI is DCI for power control, and the like. For example, DCI format 1, which is the scheduling control information (DL grant) of the downlink data, may include at least one piece of information among the following pieces of control information.

Resource allocation type 0/1 flag: indicates whether a resource allocation scheme is type 0 or type 1. Type 0 applies a bitmap scheme so as to allocate resources in units of resource block groups (RBGs). In the LTE system, the basic unit of scheduling is an RB, represented by a time-frequency domain resource, and an RBG includes multiple RBs, and thus becomes a basic unit of scheduling in the type 0 scheme. Type 1 allocates a certain RB within an RBG.

Resource block assignment: indicates an RB allocated to data transmission. The represented resource is determined according to the system bandwidth and a resource allocation scheme.

Modulation and coding scheme (MCS): indicates the modulation scheme used for data transmission and the size of a transport block (TB), that is, the data to be transmitted.

HARQ process number: indicates a HARQ process number.

New data indicator: indicates a HARQ initial transmission or retransmission.

Redundancy version: indicates the redundancy version of data to be transmitted during transmission according to HARQ.

Transmit power control (TPC) command for physical uplink control channel (PUCCH): indicates a transmit power control command for a PUCCH, which is an uplink control channel.

The DCI may be subjected to a channel coding and modulation process, and may then be transmitted through a physical downlink control channel (PDCCH) (or downlink control information transmitted through a PDCCH, the terms "PDCCH" and "downlink control information" being interchangeably used hereinafter) or an enhanced PDCCH (EPDCCH) (or downlink control information transmitted through an EPDCCH, "EPDCCH" and "downlink control information" being interchangeably used hereinafter).

Generally, the DCI is independently scrambled by a particular radio network temporary identifier (RNTI) (which may be understood as a terminal identifier or a terminal ID) for each terminal so as to have a cyclic redundant check (CRC) bit added thereto, is channel-coded, and is then configured as independent PDCCH and then transmitted. In the time domain, the PDCCH is mapped and then transmitted during the control channel transmission section. The mapping location in the frequency domain of the PDCCH may be determined based on an identifier of each terminal and transmitted over the entire system transmission bandwidth.

The downlink data may be transmitted through a physical downlink shared channel (PDSCH), which is a physical channel for downlink data transmission. The PDSCH may be transmitted after the control channel transmission section in the time axis, and scheduling information of a detailed mapping location in the frequency domain of the PDSCH, a modulation scheme, or the like may be determined based on the DCI transmitted through the PDCCH.

Through MCS, among the pieces of control information configuring the DCI, a base station provides notification of the modulation scheme applied to a PDSCH to be transmitted to a terminal and the size of data (transport block size (TBS)) to be transmitted. In an embodiment, the MCS may include 5 bits or a number of bits greater than or less than 5 bits. The TBS corresponds to a size before channel coding for error correction is applied to a data transport block (TB) to be transmitted by the base station.

Modulation schemes supported by the LTE system include quadrature phase shift keying (QPSK), 16 quadrature amplitude modulation (QAM), and 64 QAM, of which modulation orders Qms correspond to 2, 4, and 6, respectively. That is, in the case of QPSK modulation, 2 bits per symbol may be transmitted, in the case of 16 QAM modulation, 4 bits per symbol may be transmitted, and in the case of 64 QAM modulation, 6 bits per symbol may be transmitted. In addition, modulation schemes above 256 QAM may be used depending on system modification.

Figure 2:
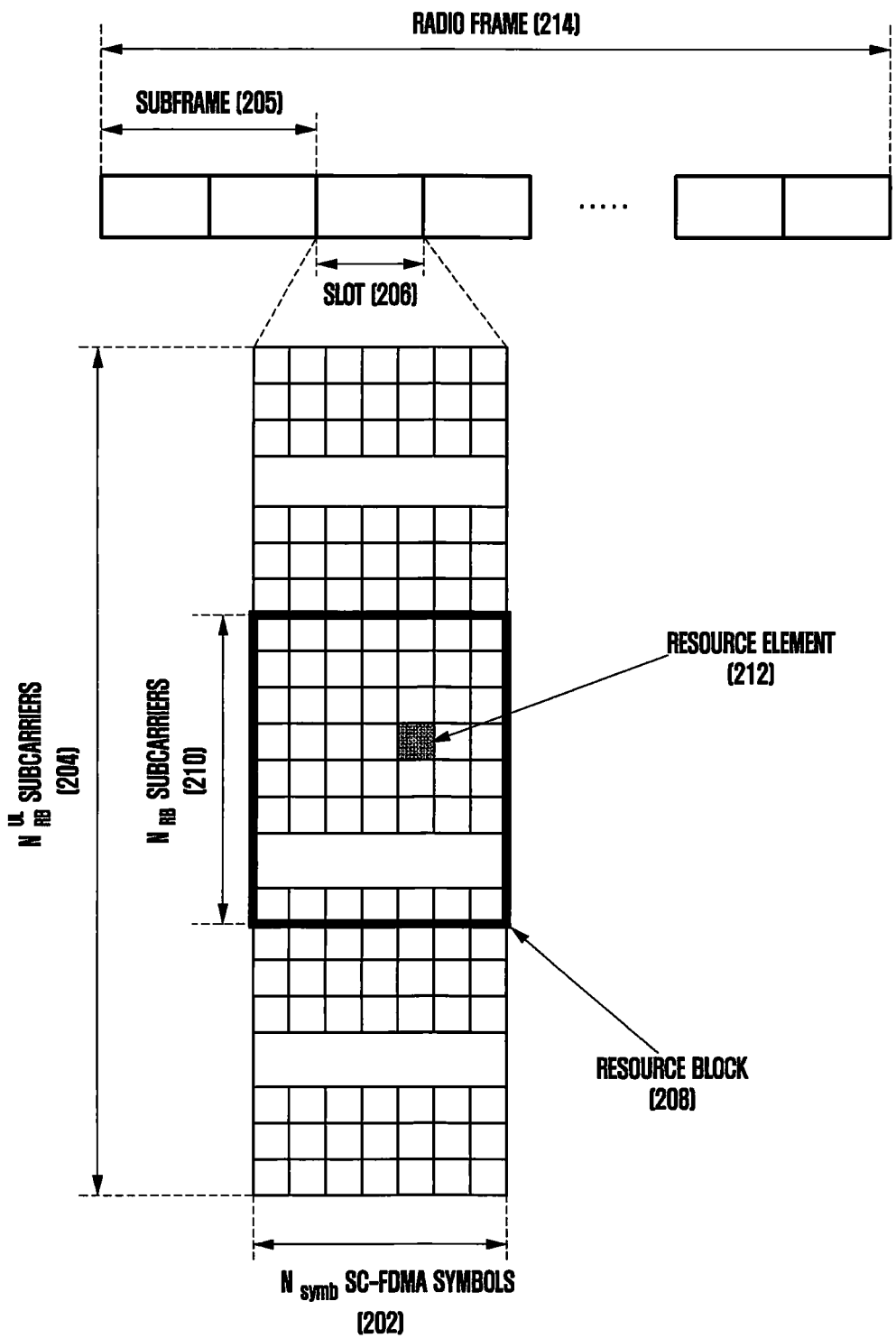
FIG. 2 illustrates an uplink time-frequency domain transmission structure of an LTE or LTE-A system.

FIG. 2 illustrates a basic structure of a time-frequency domain, that is, a radio resource domain, in which data or control information is transmitted in an uplink of an LTE system and a system similar thereto.

Referring to FIG. 2, the horizontal axis represents the time domain and the vertical axis represents the frequency domain. The minimum transmission unit in the time domain is an SC-FDMA symbol, and one slot 206 may be configured by collecting $N_{symb}$ SC-FDMA symbols 202. In addition, one subframe 205 is configured by collecting two slots. One radio frame 214 is configured by collecting 10 subframes. The minimum transmission unit in the frequency domain is a subcarrier, in which an entire system transmission bandwidth 204 includes a total of $N_{BW}$ subcarriers 204. $N_{BW}$ may have a value proportional to the system transmission bandwidth.

The basic unit of resources in the time-frequency domain is a resource element (RE) 212, and may be defined by an SC-FDMA symbol index and a subcarrier index. A resource block (RB) 208 may be defined by $N_{symb}$ consecutive SC-FDMA symbols in the time domain and $N_{RB}$ consecutive subcarriers 210 in the frequency domain. Accordingly, one RB includes $N_{symb} \times N_{RB}$ REs. In general, a minimum transmission unit of data or control information is an RB unit. A PUCCH is mapped to a frequency domain corresponding to one RB and transmitted in one subframe.

In the LTE system, it is possible to define a timing relationship of a PUCCH or a PUSCH, that is, an uplink physical channel, through which a HARQ ACK/NACK corresponding to a PDSCH as a physical channel for downlink data transmission or a PDCCH or EPDDCH including a semi-persistent scheduling release (SPS release) is transmitted. For example, in an LTE system operating according to frequency division duplex (FDD), HARQ ACK/NACK, corresponding to the PDSCH transmitted in an (n-4)th subframe, or PDCCH or EPDCCH including the SPS release may be transmitted through the PUCCH or the PUSCH in an n-th subframe.

In the LTE system, a downlink HARQ adopts an asynchronous HARQ scheme in which a data retransmission time point is not fixed. That is, if, for initial transmission data transmitted by the base station, the HARQ NACK is fed back from the terminal, the base station freely determines the transmission time point of data to be retransmitted based on a scheduling operation. The terminal may perform buffering of data, which is determined as an error as a result of decoding the received data for a HARQ operation, and may then combine the same with data to be retransmitted next.

If the terminal receives a PDSCH including downlink data transmitted from the base station in subframe n, the terminal transmits uplink control information including a HARQ ACK or a NACK of the downlink data to the base station through a PUCCH or PUSCH in subframe (n+k). For example, k may be defined differently depending on whether the LTE system adopts FDD or time division duplex (TDD), and the UL/DL subframe configuration thereof. For example, in the case of an FDD LTE system, k is fixed to 4. In the case of a TDD LTE system, k may be determined according to a subframe configuration and a subframe number. In addition, if data is transmitted through multiple carriers, the value of k may be applied differently depending on the TDD configuration of each carrier.

In the LTE system, unlike a downlink HARQ, an uplink HARQ adopts a synchronous HARQ scheme in which a data transmission time point is fixed. That is, an uplink/downlink timing relationship between a physical uplink shared channel (PUSCH), which is a physical channel for uplink data transmission, a PDCCH, which is a downlink control channel preceding the PUSCH, and a physical hybrid indicator channel (PHICH), which is a physical channel through which a downlink HARQ ACK/NACK corresponding to the PUSCH is transmitted, may be determined by the following rules.

If, in the subframe n, the terminal receives a PDCCH including uplink scheduling control information transmitted from the base station or a PHICH through which a downlink HARQ ACK/NACK is transmitted, the terminal transmits uplink data corresponding to the control information through a PUSCH in a sub frame (n+k). In this case, k may be defined differently depending on whether the LTE system adopts FDD or TDD, and on the subframe configuration thereof. For example, in the case of a FDD LTE system, k may be fixed to 4. In the case of a TDD LTE system, k may be determined according to a subframe configuration and a subframe number. In addition, if data is transmitted through multiple carriers, the value of k may be applied differently depending on the TDD configuration of each carrier.

In addition, if, in subframe i, the terminal receives a PHICH including information related to the downlink HARQ ACK/NACK from the base station, the PHICH corresponds to a PUSCH that the terminal transmits in subframe (i-k). For example, k may be defined differently depending on whether FDD or TDD is implemented in the LTE system and on the subframe configuration thereof. For example, in the case of the FDD LTE system, k is fixed to 4. In the case of the TDD LTE system, k may be determined according to the subframe configuration and the subframe number. In addition, if data is transmitted through multiple carriers, the value of k may be applied differently depending on the TDD configuration of each carrier.

TABLE 2

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI | UE specific by | Single-antenna port, |
| | format 1 | C-RNTI | port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission, port 7 and 8 (see subclause 7.1.5A) or single-antenna port, port 7 or 8 (see subclause 7.1.1) |

<Table 2> above describes supportable DCI format types according to each transmission mode in conditions configured by C-RNTI included in 3GPP TS 36.213. A terminal performs search and decoding under the assumption that the corresponding DCI format exists in a control space section according to a pre-configured transmission mode. For example, if the terminal receives transmission mode 8 as an indication, the terminal searches for a DCI format 1A in a common search space and a UE-specific search space, and searches for a DCI format 2B only in the UE-specific search space.

The wireless communication system has been described with reference to the LTE system, but the disclosure is not limited to the LTE system, and may be applied to various wireless communication systems, including NR, 5G, and the like. In addition, in an embodiment, in the case of being applied to another wireless communication system, the value of k described above may be changed and applied even to a system using a modulation scheme corresponding to FDD.

Figure 3:
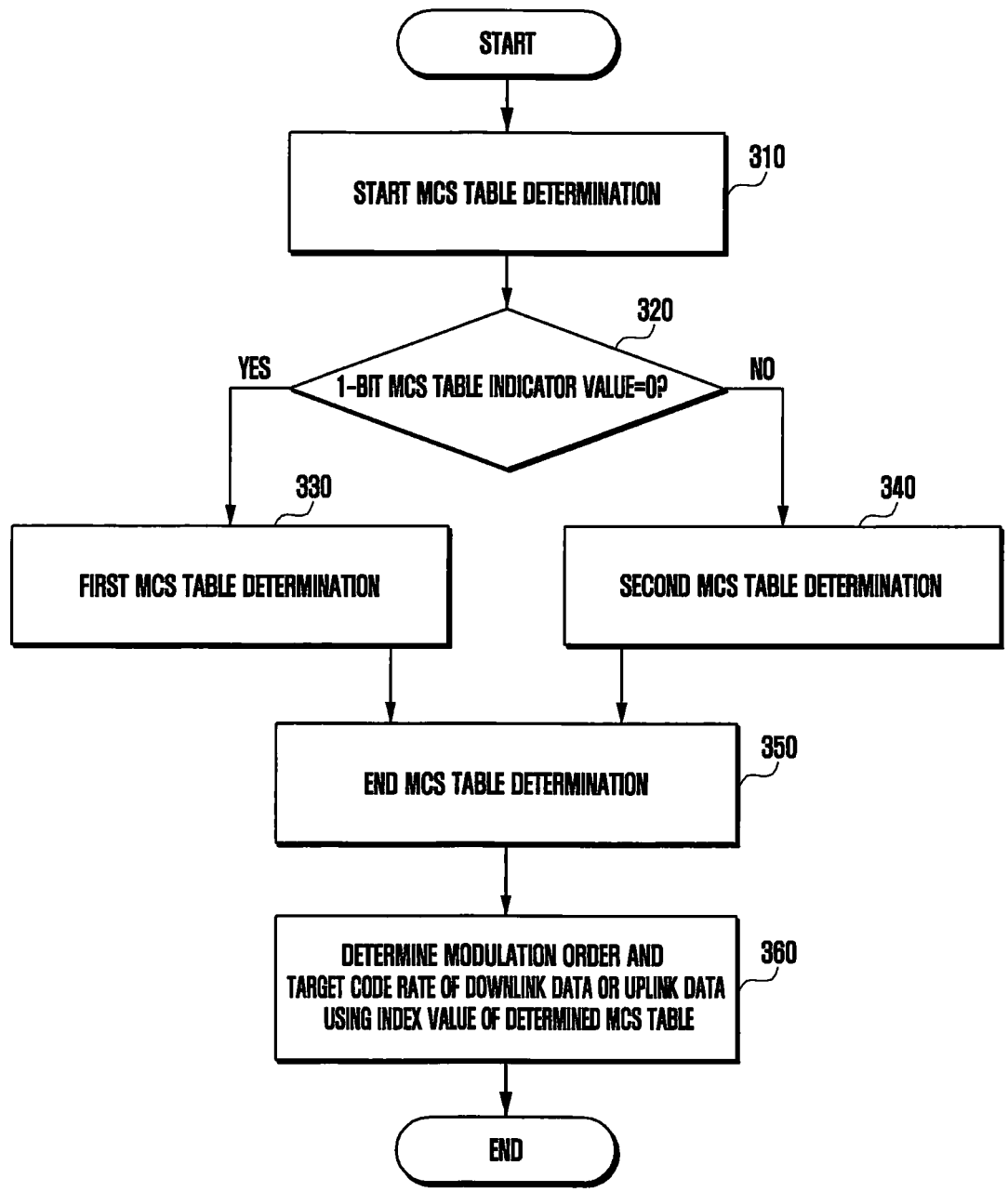
FIG. 3 is a flowchart illustrating a method for determining an MCS table by a terminal according to a first embodiment.

FIG. 3 is a flowchart illustrating a method for determining an MCS table by a terminal according to the first embodiment.

A base station may select one of MCS tables, which are designed to have different target block length error rate (BLER) values, and provide the selected MCS table to a terminal (operation 310). For example, one of the MCS tables may be an MCS table that is configured with MCS values satisfying a target BLER of $10^{-1}$ (or a data transmission success rate of 90%). This is referred to as a first MCS table in the disclosure. According to another example, one of the MCS tables may be an MCS table configured with MCS values satisfying a target BLER of $10^{-5}$ (or a data transmission success rate of 99.999%). This is referred to as a second MCS table in the disclosure.

According to an example, the configuration of the first MCS table may be as shown in <Table 3> below. According to an example, the configuration of the second MCS table may be as shown in <Table 4> below. Referring to <Table 3> and <Table 4>, some MCS indexes may have the same modulation order, the same target code rate, or the same spectral efficiency values. <Table 3> shows the first MCS table based on the target BLER of $10^{-1}$, and <Table 4> shows the second MCS table based on the target BLER of $10^{-5}$. In the blank of Table 4, arbitrary values for satisfying the target BLER of $10^{-5}$ can be configured. In order to determine a modulation order, a target code rate, and a transport block size (TBS) of a downlink data channel, a terminal identifies MCS index values among MCS fields, configured as <Table 3> or <Table 4> in downlink control information.

TABLE 3

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 4

| MCS Index $I_{MCS}$ | Modulation Order $Q_m$ | Target code Rate R × [1024] | Spectral efficiency |
|---|---|---|---|
| 0 | | | |
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | | | |
| 16 | | | |
| 17 | | | |
| 18 | | | |
| 19 | | | |
| 20 | | | |
| 21 | | | |
| 22 | | | |
| 23 | | | |
| 24 | | | |
| 25 | | | |
| 26 | | | |
| 27 | | | |
| 28 | | | |
| 29 | | | |
| 30 | | | |
| 31 | | | |

According to the first embodiment, the terminal may determine whether an MCS index indicator in downlink control information (DCI) is based on the first MCS table or the second MCS table based on one bit in the DCI. In the disclosure, the one bit is described as an MCS table indicator. The MCS index indicator can be configured by five bits in the downlink control information. For example, if the 1-bit MCS table indicator indicates "0" (operation 320), the terminal determines a modulation order and a target code rate of downlink data or uplink data using the first MCS table and the index value of the corresponding table (operations 330, 350, and 360). According to another example, if the 1-bit MCS table indicator indicates "1" (operation 320), the terminal determines a modulation order and a target code rate of downlink data or uplink data using the second MCS table and the index values of the corresponding table (operations 340, 350, and 360). The 1-bit MCS table indicator information is included in the downlink control information existing together with CRC scrambled by C-RNTI.

For reference, the first MCS table (Table 3) and the second MCS table (Table 4) described in the first embodiment are sufficiently applicable to other embodiments.

According to the (1-1)th embodiment, for a terminal having reported, to a base station, UE capability supporting both a target BLER of $10^{-1}$ and a target BLER of $10^{-5}$, one bit, which is used as an MCS table indicator in the downlink control information having the CRC scrambled by C-RNTI, may always exist. The MCS table indicator is used to indicate whether an index value indicated by the MCS index indicator included in the downlink control information is based on the first MCS table or the second MCS table. In the case where the index value is based on the first MCS table, the terminal determines a modulation order and a target code rate of downlink data or uplink data using the index value based on the first MCS table. In the case where the index value is based on the second MCS table, the terminal determines a modulation order and a target code rate of downlink data or uplink data using the index value based on the second MCS table.

According to the (1-2)th embodiment, for a terminal having reported, to a base station, UE capability supporting only the target BLER of $10^{-1}$, the MCS index indicator in the downlink control information existing together with CRC scrambled by C-RNTI indicates an index based on the first MCS table, and the terminal determines a modulation order and a target code rate of downlink data or uplink data using the index value based on the first MCS table.

According to the (1-3)th embodiment, for a terminal having reported, to a base station, UE capability supporting only the target BLER of $10^{-5}$, the MCS index indicator in the downlink control information having the CRC scrambled by C-RNTI indicates an index based on the second MCS table, and the terminal determines a modulation order and a target code rate of downlink data or uplink data using the index value based on the second MCS table.

Figure 4:
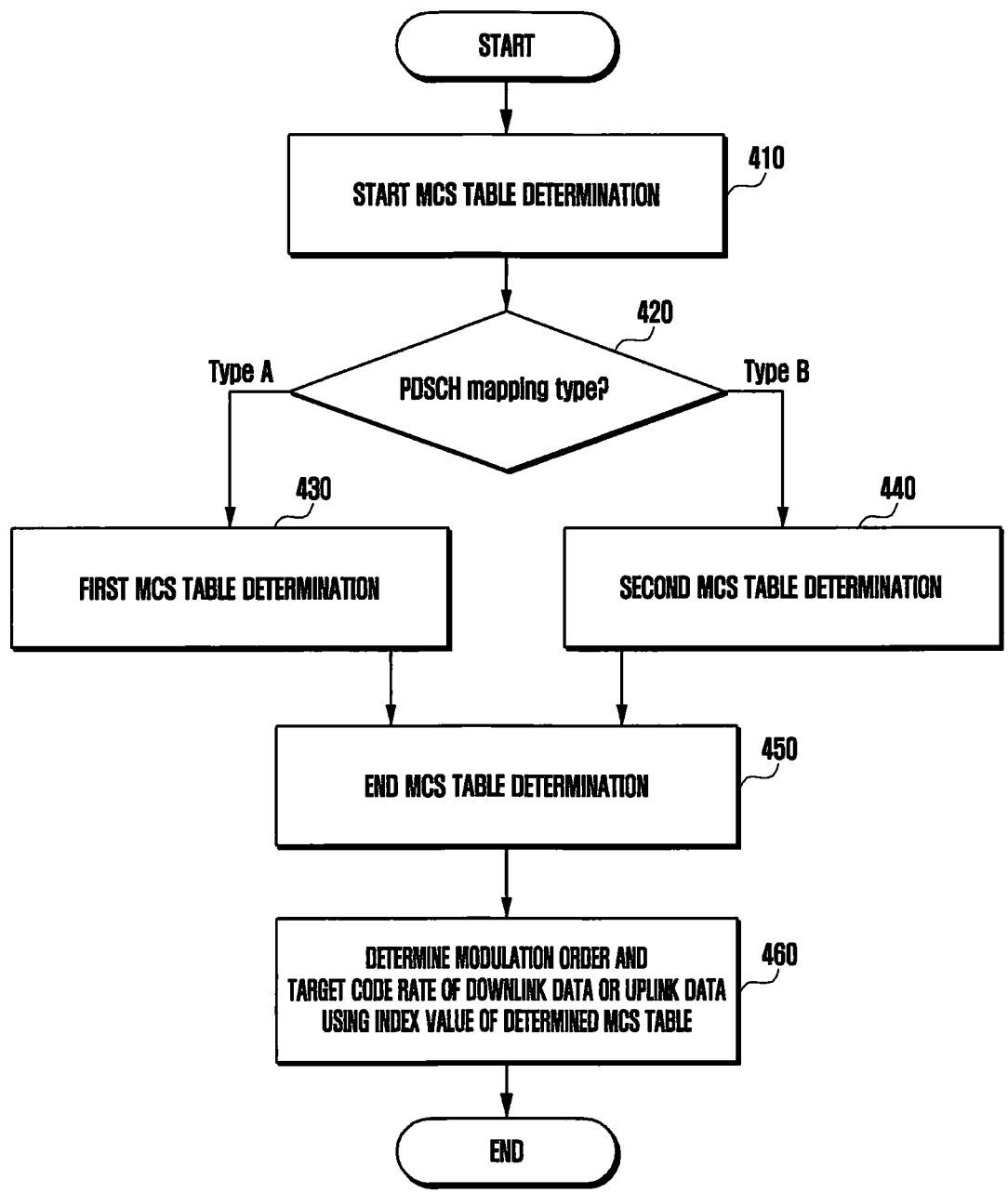
FIG. 4 is a flowchart illustrating a method for determining an MCS table by a terminal according to a second embodiment.

FIG. 4 is a flowchart illustrating a method for determining an MCS table by a terminal according to the second embodiment.

According to the second embodiment, the terminal may determine whether an MCS index indicator in downlink control information is based on a first MCS table or a second MCS table according to a value indicated by one of the fields existing in the downlink control information (operation 410).

For example, if a new data indicator (NDI) in the downlink control information is toggled, the terminal determines a modulation order and a target code rate of downlink data or uplink data using an index value indicated by the MCS index indicator based on the first MCS table. This may occur since, in the initial transmission, it is possible to use an MCS table having a high target BLER in order to improve transmission efficiency.

According to another example, if the NDI in the downlink control information is not toggled, the terminal determines a modulation order and a target code rate of downlink data or uplink data using an index value indicated by the MCS index indicator based on the second MCS table. This may occur since, in the initial transmission, it is possible to use an MCS table having a high target BLER in order to increase transmission efficiency, but in retransmission, the base station may perform transmission using an MCS table having a lower target BLER value in order to satisfy the required latency.

For example, if a PDSCH (or PUSCH) mapping type indicates type A in a time resource allocation field in the downlink control information (operation 420), the terminal determines a modulation order and a target code rate of downlink data or uplink data using the index value indicated by the MCS index indicator based on the first MCS table (operations 430, 450, and 460). The PDSCH (or PUSCH) mapping type A refers to a PDSCH in which the position of a demodulation reference signal (DMRS) for data decoding is fixed at a specific symbol position with reference to a slot boundary regardless of a data transmission start symbol position and a data transmission interval size. This is because PDSCH (or PUSCH) mapping A is more suitable for eMBB transmissions requiring a higher target BLER value than URLLC.

According to another example, if the PDSCH (or PUSCH) mapping type indicates type B in the time resource allocation field in the downlink control information (operation 420), the terminal determines a modulation order and a target code rate of downlink data or uplink data using the index value indicated by the MCS index indicator based on the second MCS table (operations 430, 450, and 460). In PDSCH (or PUSCH) mapping type B, a DMRS symbol position is changed according to a data transmission start symbol position and a data transmission interval size, and the corresponding DMRS is located at the symbol at which the data transmission starts. This is because PDSCH (or PUSCH) mapping type B is more suitable for URLLC transmission requiring a lower target BLER value than that required by eMBB.

In addition to the NDI or the PDSCH mapping type illustrated in the above example, it is sufficiently possible to determine, by the terminal, whether the MCS index indicator is based on the first MCS table or the second MCS table, by replacing the NDI or PDSCH mapping type with a time resource allocation field, a frequency resource allocation field, a redundancy version (RV) field, a downlink assignment index (DAI) field, a HARQ process number field, a PDSCH-HARQ feedback timing indicator field, and the like.

Figure 5:
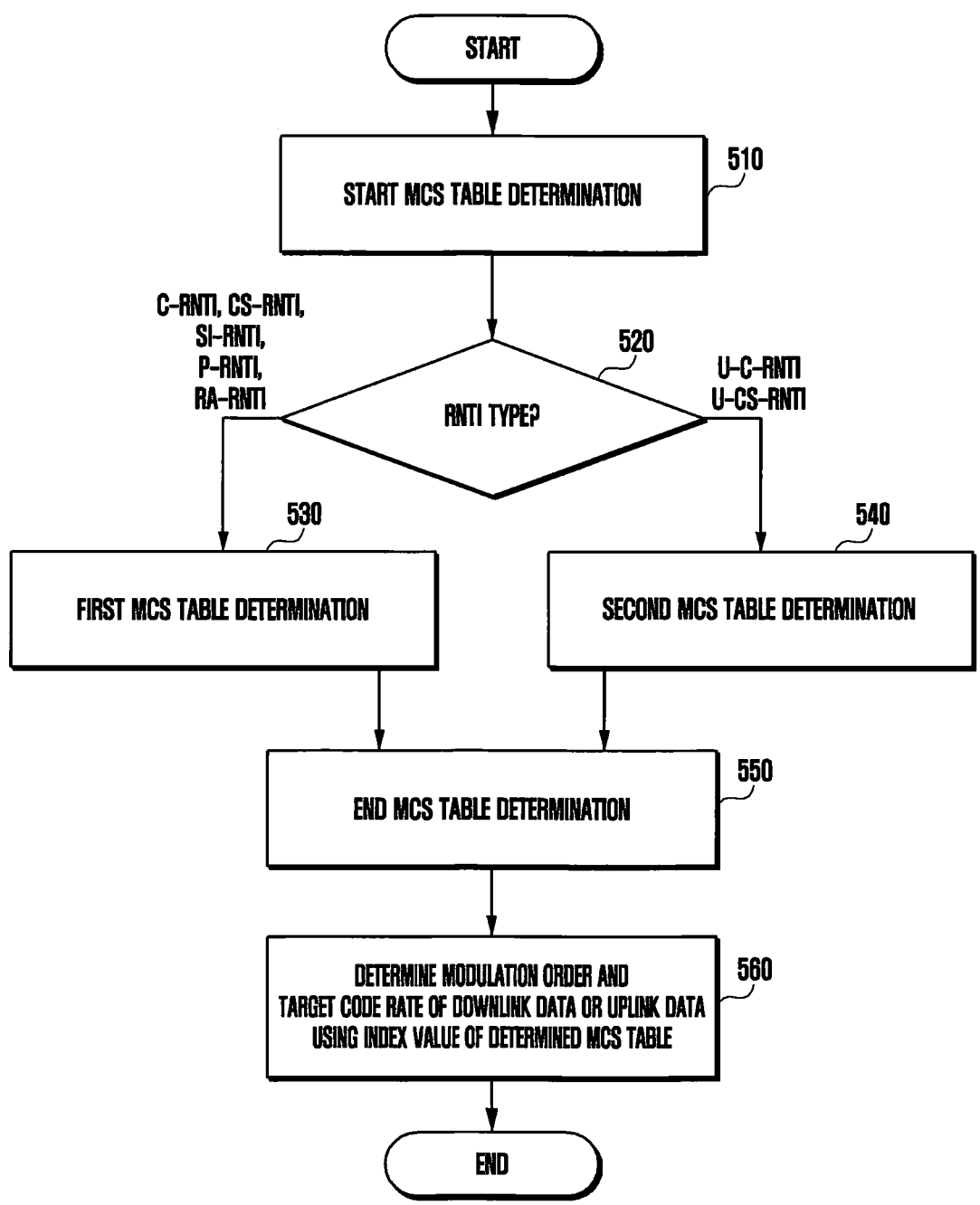
FIG. 5 is a flowchart illustrating a method for determining an MCS table by a terminal according to a third embodiment.

FIG. 5 is a flowchart illustrating a method for determining an MCS table by a terminal according to the third embodiment.

According to the third embodiment, the terminal may determine whether an MCS index indicator in downlink control information is based on a first MCS table or a second MCS table, depending on the RNTI type scrambled with the CRC for the downlink control information (operation 510).

For example, the terminal determines that an MCS index indicator field in the downlink control information existing together with the CRC scrambled by RNTI type, such as cell RNTI (C-RNTI), configured scheduling RNTI (CS-RNTI), system information RNTI (SI-RNTI), paging RNTI (P-RNTI), or random access RNTI (RA-RNTI), is configured based on the first MCS table (operations 520 and 530). The terminal determines a modulation order and a target code rate of downlink data or uplink data using the index value indicated by the MCS index indicator based on the first MCS table (operations 530, 550, and 560). The C-RNTI and CS-RNTI are RNTIs used for transmission of information such as eMBB. SI-RNTI is an RNTI used for transmission of system information. P-RNTI is an RNTI used for transmission of paging information. RA-RNTI is an RNTI used for transmission of random access-related information. The terminal determines that the MCS index indicator field in the downlink control information, which exists together with the CRC scrambled by the RNTI type, such as C-RNTI, CS-RNTI, SI-RNTI, P-RNTI, or RA-RNTI, is configured based on the first MCS table because uplink data or downlink data associated with the RNTIs described above are services that do not require a target BLER of $10^{-5}$.

According to another example, the terminal determines that the MCS index indicator field in the downlink control information, which exists together with the CRC scrambled by the RNTI type, such as URLLC C-RNTI (U-C-RNTI) or URLLC CS-RNTI (U-CS-RNTI), is configured based on the second MCS table (operations 520 and 540). The terminal determines a modulation order and a target code rate of downlink data or uplink data using the index value indicated by the MCS index indicator based on the second MCS table (operations 540, 550, and 560). The U-C-RNTI and U-CS-RNTI are RNTIs used for transmission of information such as URLLC. The terminal determines that the MCS index indicator field in the downlink control information having the CRC scrambled by the U-C-RNTI and the U-CS-RNTI is configured based on the second MCS table because uplink data or downlink data associated with the RNTIs are services requiring a target BLER of $10^{-5}$.

Figure 6:
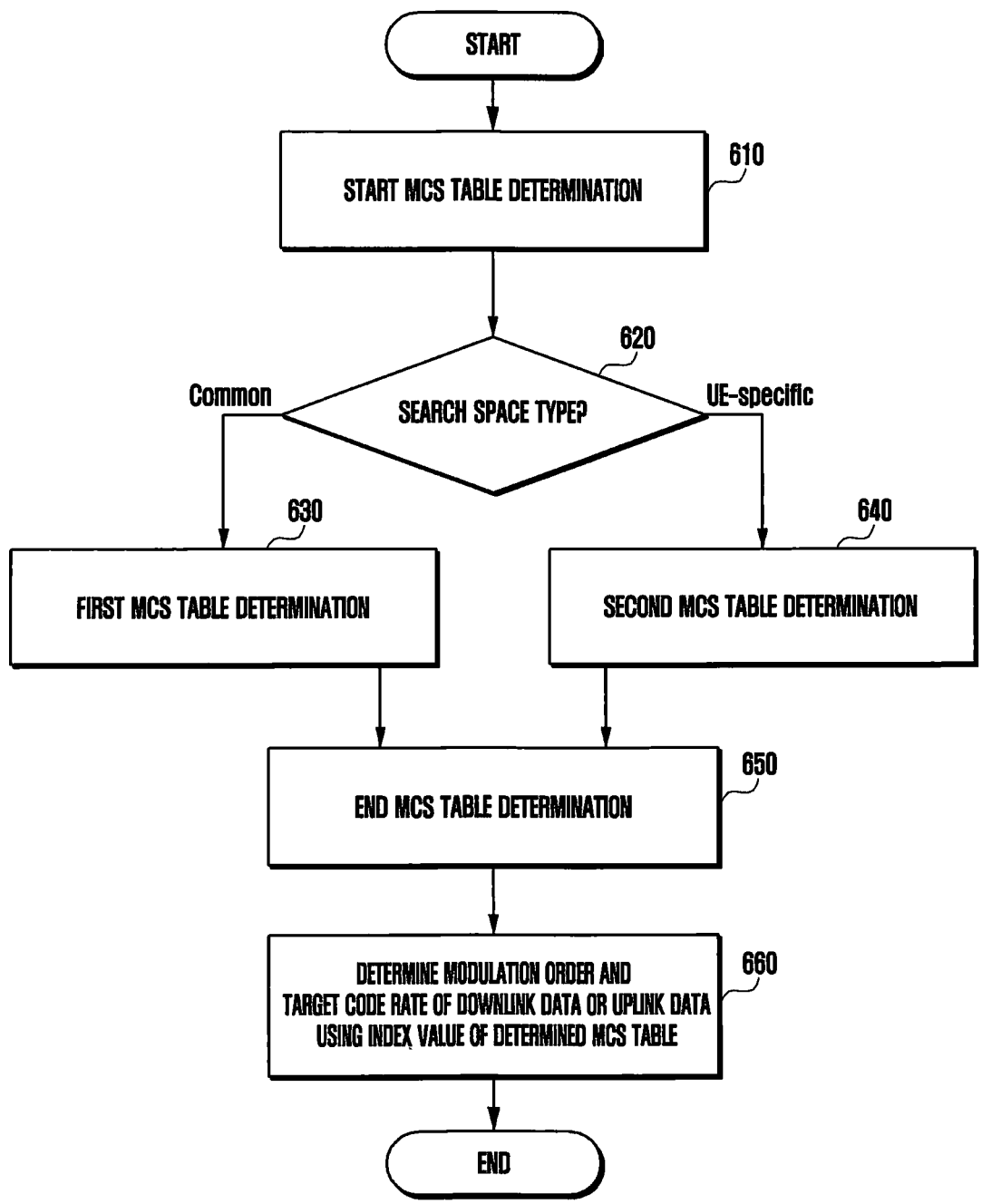
FIG. 6 is a flowchart illustrating a method for determining an MCS table by a terminal according to a fourth embodiment.

FIG. 6 is a flowchart illustrating a method for determining an MCS table by a terminal according to the fourth embodiment (610).

According to the fourth embodiment, a terminal may determine whether the MCS index indicator in the downlink control information is based on the first MCS table or the second MCS table according to a search space type of a physical downlink control channel (PDCCH) searched for by the terminal. A set of PDCCH candidates searched for by the terminal is called a search space, and a set of PDCCH candidates searched for by all terminals in common is called a common search space (CSS) and a set of PDCCH candidates individually searched for by a specific terminal is called a UE-specific search space (USS).

For example, the terminal determines that the MCS index indicator field in the downlink control information found in the common search space is configured based on the first MCS table (operations 620 and 630), and the terminal determines a modulation order and a target code rate of downlink data or uplink data using an index value indicated by the MCS index indicator based on the first MCS table (operations 630, 640, and 650). The terminal determines that the MCS index indicator field in the downlink control information found in the common search space is configured based on the first MCS table because the common search space is a control information search area used for transmission of data such as system information, paging information, and random access information, which are not related to a specific data service such as eMBB or URLL, and thus do not require a target BLER of $10^{-5}$.

According to another example, the terminal determines that the MCS index indicator field in the downlink control information found in the UE-specific search space is configured based on the second MCS table (operations 620 and 640), and the terminal determines a modulation order and a target code rate of downlink or uplink data using the index value indicated by the MCS index indicator based on the second MCS table (operations 640, 650, and 660). The terminal determines that the MCS index indicator field in the downlink control information found in the UE-specific search space is configured based on the second MCS table because the UE-specific search space is a control information search area in which data related to a specific data service such as eMBB or URLLC can be transmitted, and a target BLER of $10^{-5}$ is required to support data transmission requiring high reliability, such as URLLC. If the terminal determines that the MCS index indicator field in the downlink control information found in the UE-specific search space is configured based on the second MCS table, the terminal that made the determination does not correspond to one of terminals supporting only eMBB. Instead, the terminal may be one of terminals supporting URLLC. Otherwise, the terminal may not correspond to one of terminals having reported the capability of URLLC non-supporting to the base station. Instead, the terminal may be one of terminals having reported the UE capability of URLLC supporting to the base station.

Figure 7:
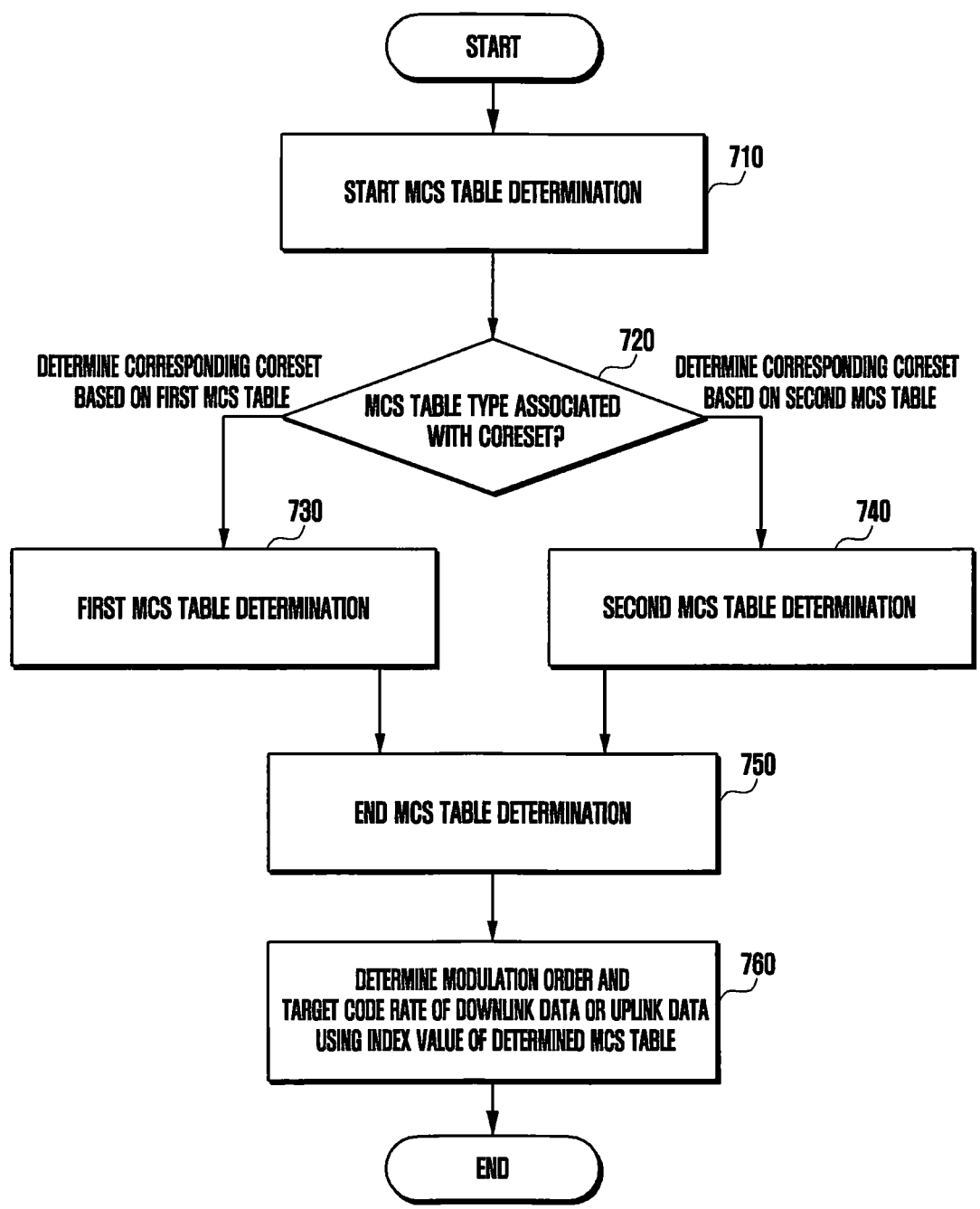
FIG. 7 is a flowchart illustrating a method for determining an MCS table by a terminal according to a fifth embodiment.

FIG. 7 is a flowchart illustrating a method for determining an MCS table by a terminal according to the fifth embodiment (710).

According to the fifth embodiment, when the terminal receives, from a base station, configuration of a control resource set (CORESET), which is a resource area in which downlink control information is searched for, the base station may configure whether the MCS index indicator field in downlink control information transmitted from the corresponding CORESET is based on the first MCS table or the second MCS table via higher-layer signaling.

For example, in the case where the base station is configured such that the MCS index indicator in the downlink control information transmitted in the first CORESET is based on the first MCS table (operation 720), the terminal determines that the MCS index indicator field found in the first CORESET is configured based on the first MCS table (operation 730). The terminal determines a modulation order and a target code rate of downlink data or uplink data using the index value indicated by the MCS index indicator based on the first MCS table (operations 750 and 760).

According to another example, in the case where the base station is configured such that the MCS index indicator in the downlink control information transmitted in the second CORESET is based on the second MCS table (operation 720), the terminal determines that the MCS index indicator field found in the second CORESET is configured based on the second MCS table (operation 740). The terminal determines a modulation order and a target code rate of downlink data or uplink data using the index value indicated by the MCS index indicator based on the second MCS table (operations 750 and 760).

Figure 8:
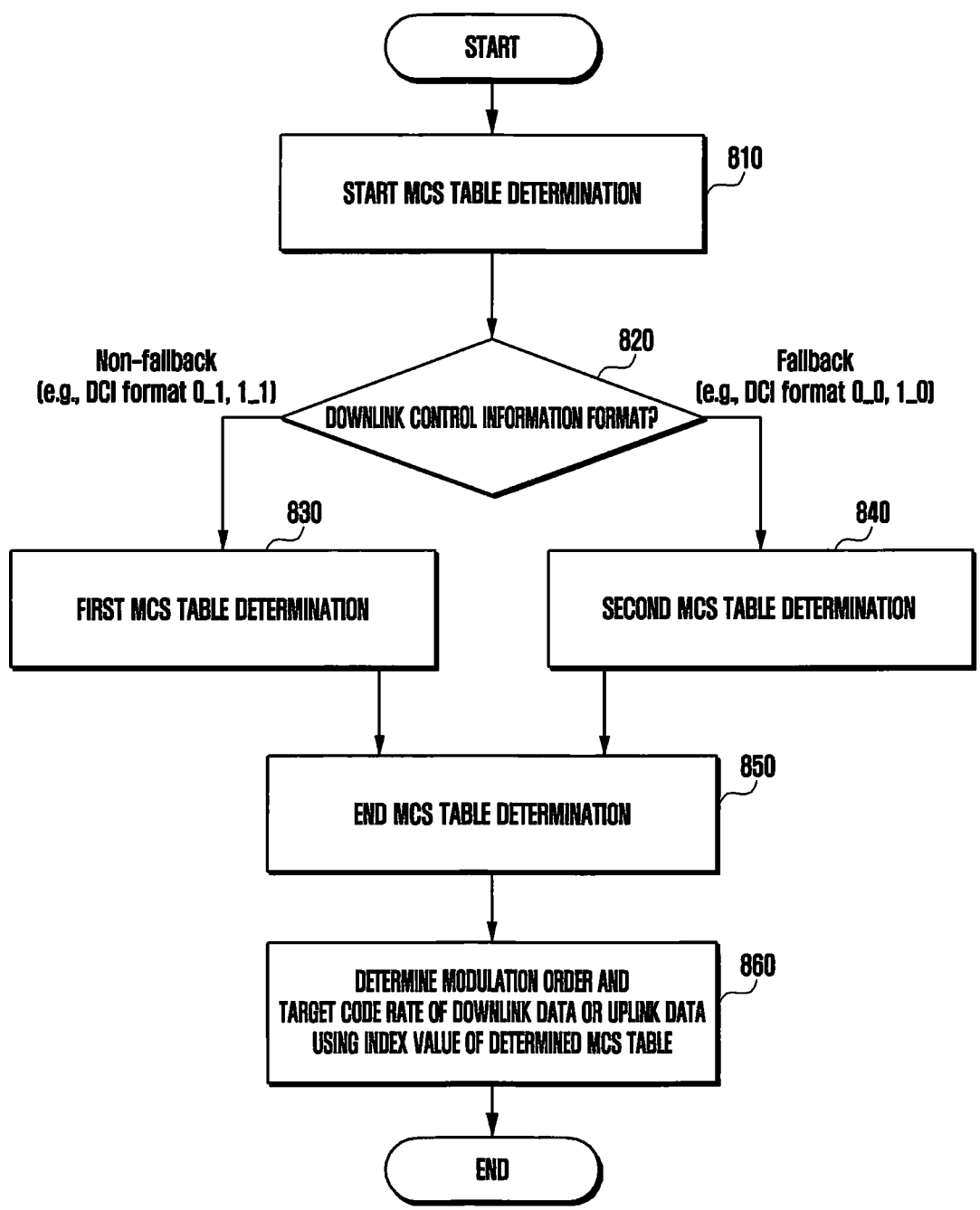
FIG. 8 is a flowchart illustrating a method for determining an MCS table by a terminal according to a sixth embodiment.

FIG. 8 is a flowchart illustrating a method for determining an MCS table by a terminal according to the sixth embodiment (810).

According to the sixth embodiment, the terminal may determine whether an MCS index indicator in downlink control information is based on the first MCS table or the second MCS table according to the downlink control information format found by the terminal.

For example, the terminal determines that an MCS index indicator field in a fallback downlink information format that can be transmitted in both a common search space and a UE-specific search space is configured based on the second MCS table (operations 820 and 840). The terminal determines a modulation order and a target code rate of downlink data or uplink data using an index value indicated by the MCS index indicator based on the second MCS table (operations 840, 850, and 860). The fallback downlink control information format may correspond to DCI format 0_0 for PUSCH scheduling of 5G (NR) and DCI format 1_0 for PDSCH scheduling. The terminal determines that the MCS index indicator field in the fallback downlink information format is configured based on the second MCS table because the number of fallback downlink information format bits is generally smaller than the number of non-fallback downlink information format bits, and thus it is suitable for satisfying a condition (for example, reliability).

According to another example, the terminal determines that the MCS index indicator field in the non-fallback downlink control information format that can be transmitted in the UE-specific search space is configured based on the first MCS table (operations 820 and 830). The terminal determines a modulation order and a target code rate of downlink data or uplink data using the index value indicated by the MCS index indicator based on the first MCS table (operations 830, 850, and 860). The non-fallback downlink control information format may correspond to DCI format 0_1 for PUSCH scheduling of 5G (NR) and DCI format 1_1 for PDSCH scheduling. The terminal determines that the MCS index indicator field in the non-fallback downlink information format is configured based on the first MCS table because the number of non-fallback downlink information format bits is generally larger than the number of fallback downlink information format bits, and thus it is not suitable for satisfying the URLLC requirement (e.g., reliability).

Figure 9:
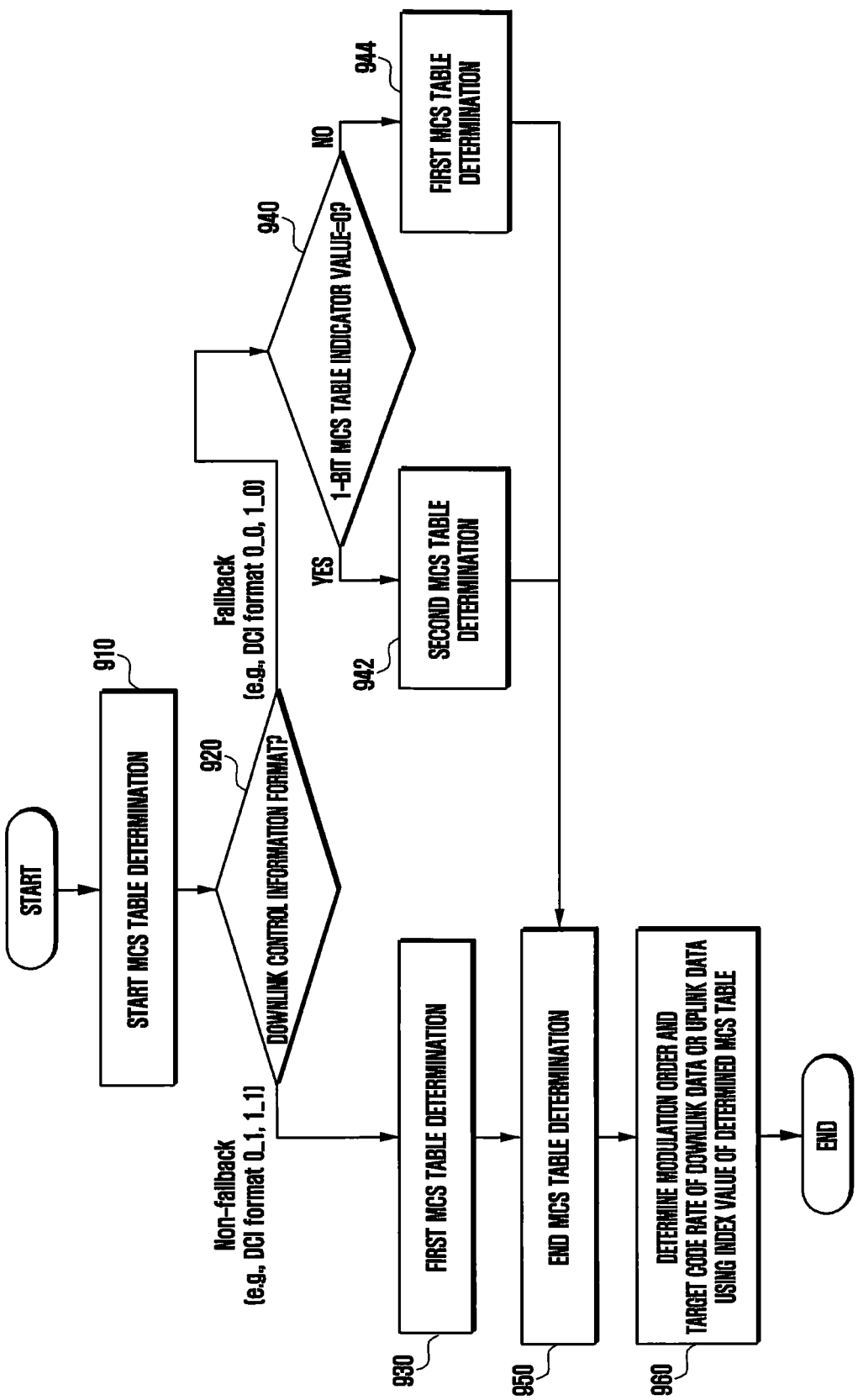
FIG. 9 is a flowchart illustrating a method for determining an MCS table by a terminal according to a seventh embodiment.

FIG. 9 is a flowchart illustrating a method for determining an MCS table by a terminal according to the seventh embodiment (910).

According to the seventh embodiment, a terminal may determine whether an MCS index indicator in downlink control information is based on a first MCS table or a second MCS table according to downlink control information format found by the terminal. In addition, an MCS table indicator field indicating whether the MCS index indicator is based on the first MCS table or the second MCS table is separately included in a specific downlink control information format.

For example, a fallback downlink control information format that can be transmitted in both a common search space and ae UE-specific search space includes a 1-bit MCS table indicator field (operation 920). The MCS table indicator field indicates whether the MCS index indicator is based on the first MCS table or the second MCS table (operation 940). The terminal determines a modulation order and a target code rate of downlink data or uplink data using the index value indicated by the MCS index indicator based on a specific MCS table indicated by the MCS table indicator field (operations 942, 944, 960, and 960). The fallback downlink control information format may correspond to DCI format 0_0 for PUSCH scheduling of 5G (NR) and DCI format 1_0 for PDSCH scheduling. The MCS table indicator field is added to the fallback downlink control information format because eMBB and URLLC data can be dynamically supported in the fallback downlink control information format at the same time. In addition, other pieces of information (e.g., system information, paging information, and random access information) other than eMBB and URLLC data are also supported in the fallback downlink control information format.

According to another example, the terminal determines that an MCS index indicator field in a non-fallback downlink control information format that can be transmitted in the UE-specific search space is configured based on the first MCS table (operations 920 and 930). The terminal determines a modulation order and a target code rate of downlink data or uplink data using the index value indicated by the MCS index indicator based on the first MCS table (operations 930, 950, and 960). The non-fallback downlink control information format may correspond to DCI format 0_1 for PUSCH scheduling of 5G (NR) and DCI format 1_1 for PDSCH scheduling. The terminal determines that the MCS index indicator field in the non-fallback downlink information format is configured based on the first MCS table because the number of non-fallback downlink information format bits is generally larger than the number of fallback downlink information format bits, and thus it is not suitable for satisfying the URLLC requirement (e.g., reliability, $10^{-5}$ target BLER).

Figure 10:
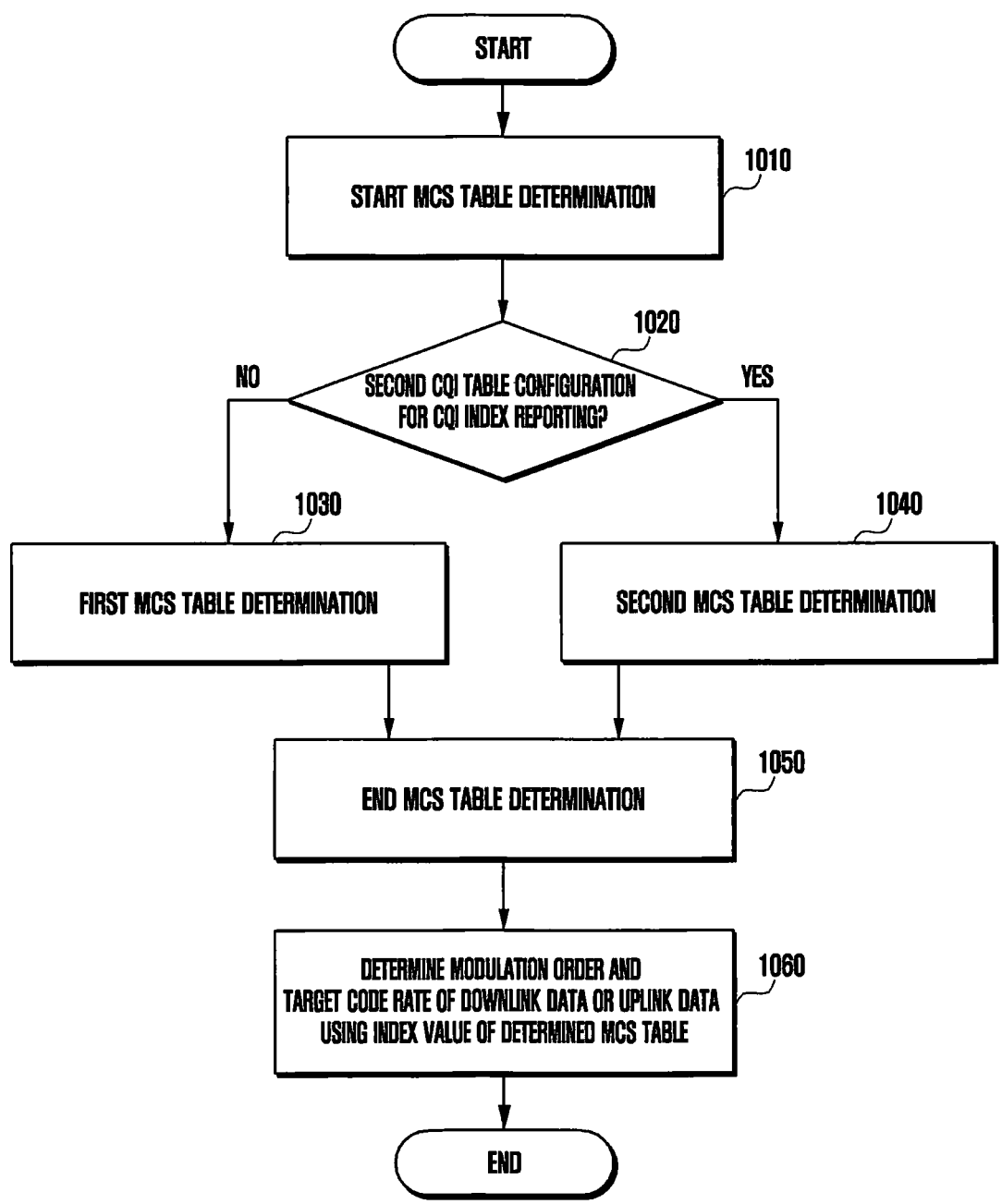
FIG. 10 is a flowchart illustrating a method for determining an MCS table by a terminal according to an eighth embodiment.

FIG. 10 is a flowchart illustrating a method for determining an MCS table by a terminal according to the eighth embodiment (1010).

According to the eighth embodiment, a terminal may determine whether an MCS index indicator in downlink control information is based on a first MCS table or a second MCS table according to a target BLER value related to channel quality indicator (CQI) configuration for measurement of channel state information (CSI).

A CQI table used for CQI index reporting may include a first CQI table based on a target BLER of $10^{-1}$ and a second CQI table based on a target BLER of $10^{-5}$. The base station may configure, via higher-layer signaling, whether the terminal uses the first CQI table or the second CQI table for CQI index reporting according to the result of channel measurement. In addition, CQI index reporting based on a specific CQI table, configured through the higher-layer signaling, can be performed based on the first CQI table and the second CQI table, which can be independently configured for a terminal. In other words, the terminal may receive configuration, as the CQI table used for CQI index reporting, of the first CQI table, the second CQI table, or both of them. The CQI index reporting is transmitted from the terminal to the base station through an uplink control channel or a data channel.

For example, if the terminal does not receive configuration of the CQI index reporting based on the second CQI table (operation 1020), the terminal determines that an MCS index indicator field in a downlink control information format found in a downlink control channel is configured based on the first MCS table (operation 1030). The terminal determines a modulation order and a target code rate of downlink data or uplink data using the index value indicated by the MCS index indicator based on the first MCS table (operations 1030, 1050, and 1060).

When the terminal has received the configuration of the CQI index reporting based on the second CQI table (operation 1020), the terminal determines that the MCS index indicator field in the downlink control information format found in the downlink control channel is configured based on the second MCS table (operation 1040). The terminal determines a modulation order and a target code rate of downlink data or uplink data using the index value indicated by the MCS index indicator based on the second MCS table (operations 1040, 1050, and 1060).

According to the (8-1)th embodiment, if the terminal has received the configuration of the CQI index reporting based on the first CQI table, the terminal determines that the MCS index indicator field in the downlink control information format found in the downlink control channel is based on the first MCS table. The terminal determines a modulation order and a target code rate of downlink data or uplink data using the index value indicated by the MCS index indicator based on the first MCS table.

If the terminal has received the configuration of the CQI index reporting based on the second CQI table, the terminal determines that the MCS index indicator field in the downlink control information format found in the downlink control channel is configured based on the second MCS table. The terminal determines a modulation order and a target code rate of downlink data or uplink data using the index value indicated by the MCS index indicator based on the second MCS table.

If the terminal has received the configuration of all the CQI index reporting based on both the first CQI table and the second CQI table, the terminal determines that the MCS index indicator field in the downlink control information format found in the downlink control channel is configured based on the second MCS table. The terminal determines a modulation order and a target code rate of downlink data or uplink data using the index value indicated by the MCS index indicator based on the second MCS table.

According to the (8-2)th embodiment, if the terminal has received the configuration of the CQI index reporting based on the first CQI table, the terminal determines that the MCS index indicator field in the downlink control information format found in the downlink control channel is configured based on the first MCS table. The terminal determines a modulation order and a target code rate of downlink data or uplink data using the index value indicated by the MCS index indicator based on the first MCS table.

If the terminal has received the configuration of the CQI index reporting based on the second CQI table, the terminal determines that the MCS index indicator field in the downlink control information format found in the downlink control channel is configured based on the second MCS table. The terminal determines a modulation order and a target code rate of downlink data or uplink data using the index value indicated by the MCS index indicator based on the second MCS table.

If the terminal has received the configuration of all the CQI index reporting based on both the first CQI table and the second CQI table, the downlink control information format found in the downlink control channel includes a 1-bit MCS table indicator field. The MCS table indicator field indicates whether the MCS index indicator is based on the first MCS table or the second MCS table. The terminal determines a modulation order and a target code rate of downlink data or uplink data using the index value indicated by the MCS index indicator based on a specific MCS table indicated by the MCS table indicator field.

According to the (8-3)th embodiment, if the terminal does not receive configuration of the CQI index reporting based on the second CQI table, the terminal determines that the MCS index indicator field in the downlink control information format found in the downlink control channel is configured based on the first MCS table. The terminal determines a modulation order and a target code rate of downlink data or uplink data using the index value indicated by the MCS index indicator based on the first MCS table.

If the terminal receives the configuration of the CQI index reporting based on the second CQI table, the 1-bit MCS table indicator is included in the downlink control information, in a situation in .which specific conditions are satisfied, and the MCS table indicator indicates whether the MCS index indicator is based on the first MCS table or the second MCS table. The terminal determines a modulation order and a target code rate of downlink data or uplink data using the index value indicated by the MCS index indicator based on a specific MCS table indicated by the MCS table indicator field. The specific conditions are as follows.

- A total of two control information formats existing together with CRC scrambled by C-RNTI searched for by a terminal.
- The downlink control information is a DCI format for fallback (e.g., DCI format 0_0 and DCI format 1_0)
- The downlink control information is transmitted in a UE-specific search space.

If at least one of the above conditions is not satisfied, the 1-bit MCS table indicator is not included in the downlink control information, and the terminal determines whether the MCS index indicator is based on the first MCS table or the second MCS table according to the MCS table-related configuration information received via higher-layer signaling. The terminal determines a modulation order and a target code rate of downlink data or uplink data using an index value indicated by the MCS index indicator based on a specific MCS table configured through the higher-layer signaling.

Figure 11:
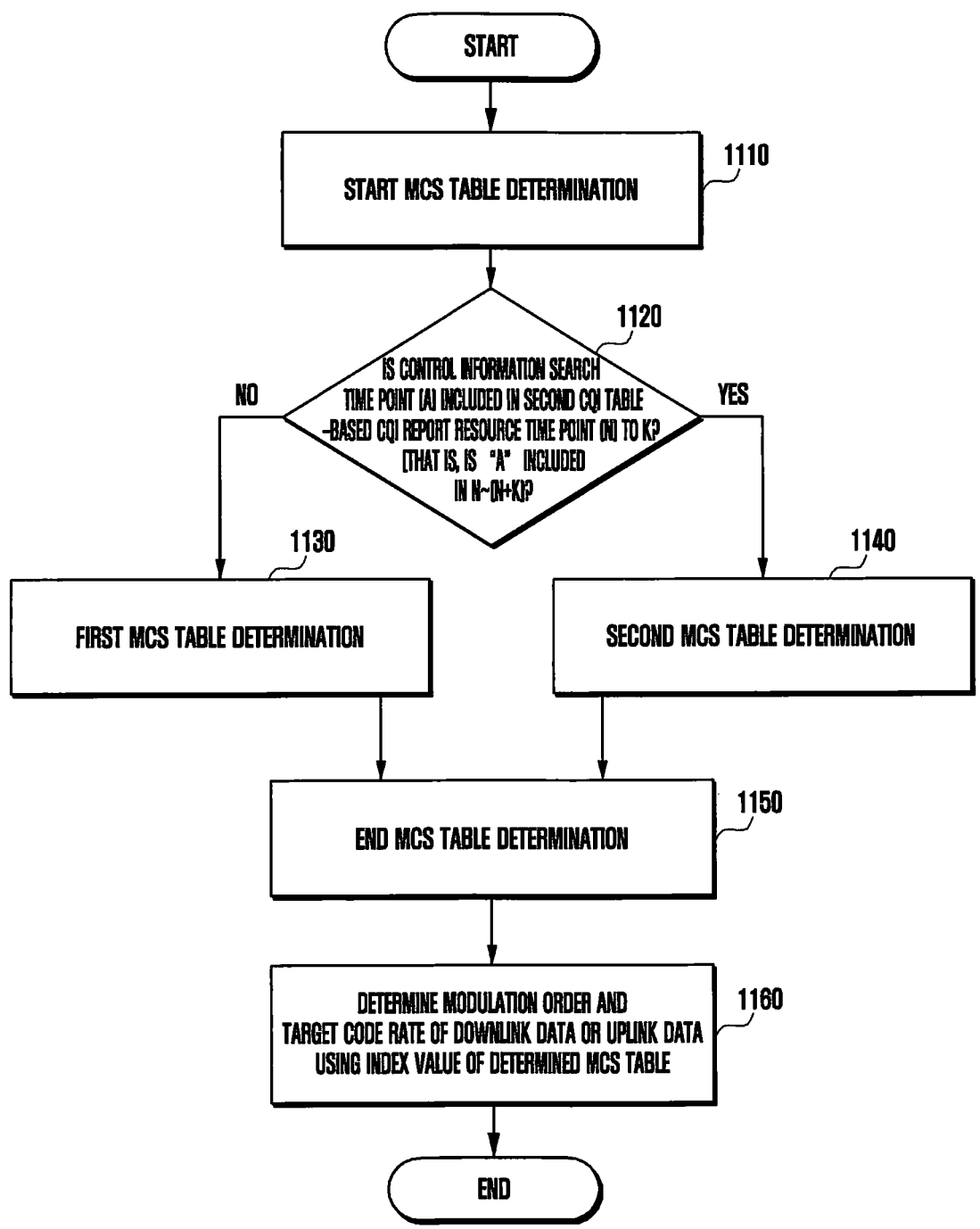
FIG. 11 is a flowchart illustrating a method for determining an MCS table by a terminal according to a ninth embodiment.

FIG. 11 is a flowchart illustrating a method for determining an MCS table by a terminal according to the ninth embodiment.

According to the ninth embodiment, the terminal determines whether the MCS index indicator in the downlink control information is based on the first MCS table or the second MCS table according to a CQI reporting time point and a valid time (operation 1110).

For example, if there is no resource configured for CQI index reporting based on the second CQI table, the terminal determines that an MCS index indicator field in a downlink control information format found in a downlink control channel is configured based on the first MCS table (operations 1120 and 1130). The terminal determines a modulation order and a target code rate of downlink data or uplink data using the index value indicated by the MCS index indicator based on the first MCS table (operations 1130, 1150, and 1160).

According to another example, if there is a resource configured for CQI index reporting based on the second CQI table, the terminal determines that the MCS index indicator field in the downlink control information format, which is searched for in the downlink control channel only for a specific time period, is configured based on the second MCS table (operations 1120 and 1140). The terminal determines a modulation order and a target code rate of downlink data or uplink data using the index value indicated by the MCS index indicator based on the second MCS table (operations 1140, 1150, and 1160). Except for the specific time period, the terminal determines that the MCS index indicator field in the downlink control information format found in the downlink control channel is configured based on the first MCS table. The terminal determines a modulation order and a target code rate of downlink data or uplink data using the index value indicated by the MCS index indicator based on the first MCS table. The specific time period includes a time period k starting from the time point (N) at which the CQI index reporting is performed based on the second CQI table, for example. In other words, the specific time period may be a period from N to (N+k). The units of N and k may be slots, symbols, or absolute times.

Figure 12:
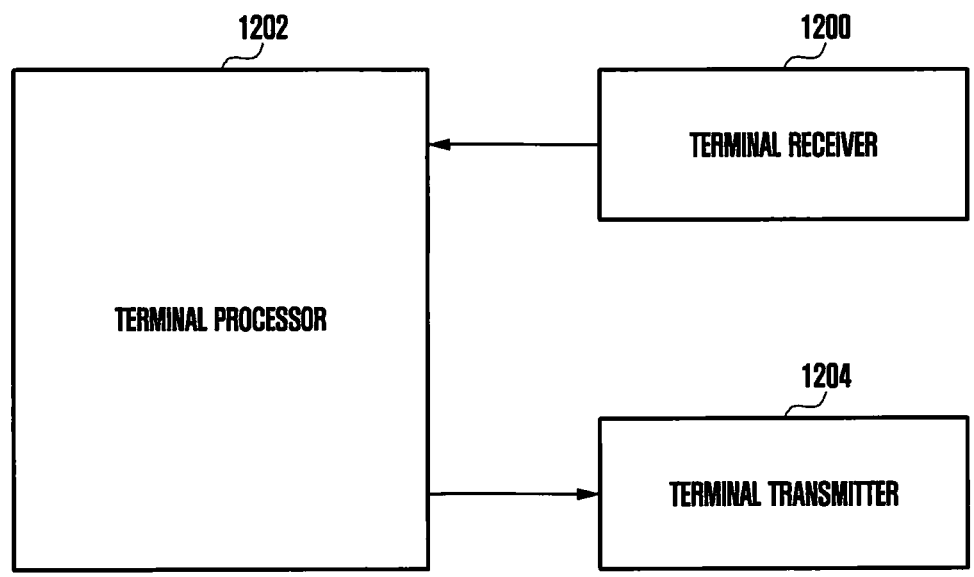
FIG. 12 is a block diagram illustrating the structure of a terminal according to embodiments.

FIG. 12 is a block diagram illustrating the structure of a terminal according to embodiments.

Referring to FIG. 12, a terminal of the disclosure may include a terminal receiver 1200, a terminal transmitter 1204, and a terminal processor 1202. The terminal receiver 1200 and the terminal transmitter 1204 may be collectively referred to as a transceiver in the embodiment. The transceiver may transmit or receive a signal to or from a base station. The signal may include control information and data. To this end, the transceiver may include an RF transmitter for up-converting and amplifying the frequency of the transmitted signal, and an RF receiver for low-noise amplifying and down-converting the received signal. In addition, the transceiver may receive a signal through a wireless channel, output the signal to the terminal processor 1202, and transmit a signal output from the terminal processor 1202 through the wireless channel. The terminal processor 1202 may control a series of processes so that the terminal operates according to the embodiment of the disclosure described above.

Figure 13:
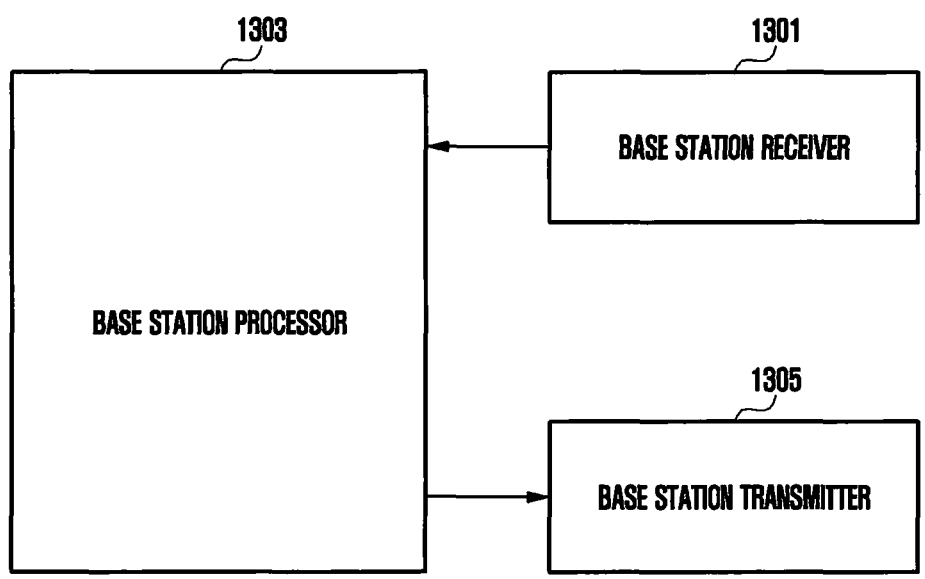
FIG. 13 is a block diagram illustrating the structure of a base station according to embodiments.

FIG. 13 is a block diagram illustrating the structure of a base station according to embodiments.

Referring to FIG. 13, according to an embodiment, a base station may include at least one of a base station receiver 1301, a base station transmitter 1305, and a base station processor 1303. The base station receiver 1301 and the base station transmitter 1305 may be collectively referred to as a transceiver in the embodiment of the disclosure. The transceiver may transmit or receive a signal to or from the terminal. The signal may include control information and data. To this end, the transceiver may include an RF transmitter for up-converting and amplifying the frequency of the transmitted signal, and an RF receiver for low-noise amplifying and down-converting the received signal. In addition, the transceiver may receive a signal through a wireless channel, output the signal to the base station processor 1303, and transmit a signal output from the terminal processor 1303 through a wireless channel. The base station processor 1303 may control a series of processes so that the base station operates according to the embodiment of the disclosure described above.

The embodiments described in the disclosure may not be applicable to UEs having reported the UE capability of URLLC non-supporting (or $10^{-5}$ target BLER non-supporting) to a base station. Alternatively, different embodiments described in the disclosure may be applicable to UEs having reported the UE capability of URLLC supporting (or $10^{-5}$ target BLER supporting) to the base station.

Meanwhile, the embodiments of the disclosure disclosed in the specification and drawings are merely to provide specific examples in order to easily explain the technical matters of the disclosure and to help understanding of the disclosure, and are not intended to limit the scope of the disclosure. That is, it will be apparent to those skilled in the art that other modified examples based on the technical idea of the disclosure may be implemented. In addition, the above embodiments can be combined with each other and used, as necessary. For example, parts of the first embodiment to the ninth embodiment of the disclosure may be combined with each other to implement the base station and the terminal. In addition, although the above embodiments have been proposed based on the NR system, other modified examples based on the technical idea of the above embodiment may be implemented in other systems, such as an FDD or TDD LTE system.

In addition, the different embodiments described in the disclosure may be combined with each other. In addition, the scope of the disclosure is not limited to the examples described in the disclosure, and the examples are sufficiently applicable to a sufficiently opposing situation.

Further, although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical idea of the disclosure.

The invention claimed is:

1. A method performed by a terminal in a wireless communication system, the method comprising:
    transmitting, to a base station, capability information including information on a support capability of the terminal associated with a specific target block error rate (BLER);
    receiving, from the base station, downlink control information (DCI) scheduling a physical downlink shared channel (PDSCH);
    identifying that a cyclic redundancy check (CRC) of the DCI is scrambled by a second type radio network temporary identifier (RNTI) associated with a second modulation and coding scheme (MCS) table; and
    in case that the CRC of the DCI is scrambled by the second type RNTI associated with the second MCS table, identifying a modulation order and a target code rate for the PDSCH, based on the second MCS table,
    wherein the second type RNTI is associated with a data with higher reliability.

2. The method of claim 1, further comprising, in case that the CRC of the DCI is scrambled by a first type RNTI associated with a first MCS table, identifying the modulation order and the target code rate for the PDSCH based on the first MCS table associated with the first type RNTI, wherein the first type RNTI is a cell-RNTI (C-RNTI).

3. The method of claim 1, further comprising:
    receiving, from the base station, a message configuring a channel quality indicator (CQI) table associated with the specific target BLER of 10Λ−5, by a higher layer signaling.

4. The method of claim 1,
    wherein the terminal monitors the DCI based on both a first type RNTI and the second type RNTI.

5. The method of claim 1, further comprising:
    receiving, from the base station, DCI scheduling a physical uplink shared channel (PUSCH);
    identifying that a CRC of the DCI is scrambled by the second type RNTI associated with the second MCS table; and
    in case that the CRC of the DCI is scrambled by the second type RNTI associated with the second MCS table, identifying a modulation order and a target code rate for the PUSCH based on the second MCS table.

6. A method performed by a base station in a wireless communication system, the method comprising:
    receiving, from a terminal, capability information including information on a support capability of the terminal associated with a specific target block error rate (BLER);
    generating downlink control information (DCI) scheduling a physical downlink shared channel (PDSCH), a cyclic redundancy check (CRC) of the DCI being scrambled by a second type radio network temporary identifier (RNTI); and
    transmitting, to the terminal, the DCI,
    wherein the second type RNTI is associated with a second modulation and coding scheme (MCS) table,
    wherein the second type RNTI is associated with a data with higher reliability, and
    wherein, in case that the CRC of the DCI is scrambled by the second type RNTI associated with the second MCS table, a modulation order and a target code rate for the PDSCH are identified based on the second MCS table.

7. The method of claim 6, wherein, in case that the CRC of the DCI is scrambled by a first type RNTI associated with a first MCS table, the modulation order and the target code rate for the PDSCH are identified based on the first MCS table associated with the first type RNTI, and wherein the first type RNTI is a cell-RNTI (C-RNTI).

8. The method of claim 6, further comprising:
    transmitting, to the terminal, a message configuring a channel quality indicator (CQI) table associated with the specific target BLER of 10Λ−5, by a higher layer signaling.

9. The method of claim 6, further comprising:
    transmitting, to the terminal, DCI scheduling a physical uplink shared channel (PUSCH),
    wherein, in case that the CRC of the DCI is scrambled by the second type RNTI associated with the second MCS table, a modulation order and a target code rate for the PUSCH are identified based on the second MCS table.

10. A terminal in a wireless communication system, the terminal comprising:
    a transceiver configured to transmit and receive a signal; and
    a controller coupled with the transceiver and configured to:
    transmit, to a base station, capability information including information on a support capability of the terminal associated with a specific target block error rate (BLER),
    receive, from the base station, downlink control information (DCI) scheduling a physical downlink shared channel (PDSCH),
    identify that a cyclic redundancy check (CRC) of the DCI is scrambled by a second type radio network temporary identifier (RNTI) associated with a second modulation and coding scheme (MCS) table, and
    in case that the CRC of the DCI is scrambled by the second type RNTI associated with the second MCS table, identify a modulation order and a target code rate for the PDSCH based on the second MCS table, and
    wherein the second type RNTI is associated with a data with higher reliability.

11. The terminal of claim 10, wherein, in case that the CRC of the DCI is scrambled by a first type RNTI associated with a first MCS table, the modulation order and the target code rate for the PDSCH are identified based on the first MCS table associated with the first type RNTI, and wherein the first type RNTI is a cell-RNTI (C-RNTI).

12. The terminal of claim 10, wherein the controller is further configured to receive, from the base station, a message configuring a channel quality indicator (CQI) table associated with the specific target BLER of 10^−5, by a higher layer signaling.

13. The terminal of claim 10, wherein the terminal monitors the DCI based on both a first type RNTI and the second type RNTI.

14. The terminal of claim 10, wherein the controller is further configured to:
   receive, from the base station, DCI scheduling a physical uplink shared channel (PUSCH);
   identify that a CRC of the DCI is scrambled by the second type RNTI associated with the second MCS table; and
   in case that the CRC of the DCI is scrambled by the second type RNTI associated with the second MCS table, identify a modulation order and a target code rate for the PUSCH based on the second MCS table.

15. A base station in a wireless communication system, the base station comprising:
   a transceiver configured to transmit and receive a signal; and
   a controller coupled with the transceiver and configured to:
   receive, from a terminal, capability information including information on a support capability of the terminal associated with a specific target block error rate (BLER),
   generate downlink control information (DCI) scheduling a physical downlink shared channel (PDSCH),
   a cyclic redundancy check (CRC) of the DCI being scrambled by a second type radio network temporary identifier (RNTI), and
   transmit, to the terminal, the DCI,
   wherein the second type RNTI is associated with a second modulation and coding scheme (MCS) table,
   wherein the second type RNTI is associated with a data with higher reliability, and
   wherein, in case that the CRC of the DCI is scrambled by the second type RNTI associated with the second MCS table, a modulation order and a target code rate for the PDSCH are identified based on the second MCS table.

16. The base station of claim 15, wherein, in case that the CRC of the DCI is scrambled by a first type RNTI associated with a first MCS table, the modulation order and the target code rate for the PDSCH are identified based on the first MCS table associated with the first type RNTI, and wherein the first type RNTI is a cell-RNTI (C-RNTI).

17. The base station of claim 15, wherein the controller is further configured to transmit, to the terminal, a message configuring a channel quality indicator (CQI) table associated with the specific target BLER of 10^−5, by a higher layer signaling.

18. The base station of claim 15, wherein the controller is further configured to transmit, to the terminal, DCI scheduling a physical uplink shared channel (PUSCH), and
   wherein, in case that the CRC of the DCI is scrambled by the second type RNTI associated with the second MCS table, a modulation order and a target code rate for the PUSCH are identified based on the second MCS table.

* * * * *